United States Patent
Siddhamalli

(10) Patent No.: US 6,411,403 B1
(45) Date of Patent: Jun. 25, 2002

(54) POLYAMIDE/POLYOLEFIN FIBER OPTIC BUFFER TUBE MATERIAL

(75) Inventor: Sridhar K. Siddhamalli, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/477,058

(22) Filed: Jan. 4, 2000

(51) Int. Cl.⁷ .................................. G02B 6/44
(52) U.S. Cl. ......................... 358/109; 385/110
(58) Field of Search ................. 385/100–119

(56) References Cited

U.S. PATENT DOCUMENTS

| | | | |
|---|---|---|---|
| 3,844,752 A | 10/1974 | Kaiser | 65/4 |
| 3,920,432 A | 11/1975 | Smith | 65/4 |
| 3,984,172 A | 10/1976 | Miller | 350/96 B |
| 4,156,104 A | 5/1979 | Mondello | 174/70 |
| 4,259,540 A | 3/1981 | Sabia | 174/23 C |
| 4,266,399 A | 5/1981 | Ellis, Jr. | 57/293 |
| 4,372,105 A | 2/1983 | Ellis, Jr. | 57/204 |
| 4,383,084 A * | 5/1983 | Paschke et al. | 525/184 |
| 4,457,583 A | 7/1984 | Mayr et al. | 350/96.23 |
| 4,538,881 A | 9/1985 | Anctil et al. | 350/96.23 |
| 4,701,016 A | 10/1987 | Gartside, III et al. | 350/96.23 |
| 4,950,436 A * | 8/1990 | Kitami et al. | 264/103 |
| 5,561,729 A * | 10/1996 | Parris | 385/113 |
| 5,762,847 A | 6/1998 | Kamps et al. | 264/140 |
| 5,911,023 A | 6/1999 | Risch et al. | 385/100 |
| 6,041,153 A * | 3/2000 | Yang | 385/109 |

FOREIGN PATENT DOCUMENTS

| | | | |
|---|---|---|---|
| DE | 30 02 363 A1 | 1/1980 | G02B/5/14 |
| EP | 0 664 320 A1 * | 7/1995 | |
| EP | 1 024 382 A2 | 8/2000 | G02B/6/44 |

* cited by examiner

Primary Examiner—Akm E. Ullah
Assistant Examiner—Michelle R. Connelly-Cushwa
(74) Attorney, Agent, or Firm—Thomas, Kayden, Horstemeyer & Risley, LLP

(57) ABSTRACT

The present invention provides a fiber optic buffer tube made of a polyamide/polyolefin blend, where the polyamide/polyolefin blend comprises a blend of Nylon-6 and polyethylene. The present invention can also be viewed as a fiber optic cable. The fiber optic cable is constructed of at least one buffer tube and at least one transmission medium positioned within the buffer tube. The buffer tube is made of a polyamide/polyolefin blend, wherein the polyamide/polyolefin blend comprises a blend of a Nylon-6 and polyethylene. The Nylon-6 and polyethylene blend is about 50–90% Nylon-6 and about 10–50% polyethylene.

12 Claims, 1 Drawing Sheet

POLYAMIDE/POLYOLEFIN FIBER OPTIC BUFFER TUBE MATERIAL

TECHNICAL FIELD

The present invention is generally related to fiber optic cables and, more particularly, is related to fiber optic buffer tubes.

BACKGROUND OF THE INVENTION

Optical fiber cables have been in use in communications industries for a number of years to transmit information at very high rates over long distances. In an optical fiber cable the information is carried in the form of light signals through glass fibers. These fibers are protected from the environment and external stresses by the cable structure.

Optical fiber cables may be classified into three general classifications based on cable structure: loose tube, slotted core, and monotube. In loose tube optical fiber cables, the optical fibers lie in a plurality of optical fiber buffer tubes which are generally filled with some type of water blocking compound such as a gel. The loose tube buffer tubes are stranded around a central strength member. In the loose tube design, in addition to the buffer tubes, filler rods may be stranded around the central member in order to provide symmetry in design for fiber counts lower than that of a full fiber count cable. The filler rods may be made of a solid or a cellular polymer.

In a slotted core cable the optical fiber reside in channels or slots that are generally filled with a water-blocking gel. The channel or slots are symmetrically placed round the central core and form helical or reverse-helical grooves extending along the longitudinal axis of the cable for receiving one or more optical fibers. In order to ensure that the optical fibers are not subject to destructive tensile and compressive stresses when the cable is bent, each slot may be made so as to follow a helical path. Thus, at a curved part of a cable, an optical fiber experiences compression and tension, and over the length of the curve the stresses at least partially cancel out. In some cables, the direction of lay of the helices may reverse at periodic intervals.

In a monotube cable the optical fibers reside in a central tube which is generally filled with some type of water-blocking compound. In all of these structures, the buffer tube or core provides the primary structure to protect the thin optical fibers contained within. Typically the buffer tubes or core are jacketed with additional protective layers. Additionally, reinforcing yarns or fibers as well as water-blocking materials in the form of gels or hot melts, water swellable powders, yarns, tapes, and/or corrugated armor may be placed between the jacket and the inner cable layers to strengthen and protect the optical fibers.

For each buffer tube design, it is important to choose material combinations which are compatible in terms of basic material properties and processability and exhibit desirable engineering thermoplastic characteristics. Key properties relevant in choosing the material and processing conditions include a low sensitivity to moisture, heat resistance, dimensional stability, chemical resistance, low density, and recyclability. More specifically, the choice of materials and processing conditions should produce a tube that is kink- and crush-resistant as well as having the ability to be score-snapped. Additional parameters that are relevant to choosing the material and processing conditions are tensile strength, flexural strength, and flexural modulus.

Materials and processing conditions must be chosen which result in a cable which has high compression resistance and tensile strength, combined with a low amount of residual stress. It is also important to choose a combination of materials and processing conditions which has minimal changes in dimensions as a function of time and temperature. It is desirable for a material to have a low coefficient of thermal expansion to ensure that the fibers are not placed under stress as the cable endures the high and low temperature extremes encountered within its environment. Favorable material and processing conditions, which minimize process-induced orientation, are also desired since these will minimize the post-extrusion relaxation and shrinkage of cable components. Post-extrusion shrinkage of buffer tubes can lead to an increase in excess fiber length (a ratio of fiber length to actual tube length) which can, in turn, cause increases in fiber attenuation.

In designing the cable structure it is important to ensure that process- or construction-induced stresses related to cable production do not interfere with optical fiber performance. The general trend in the industry is to increase rates of production to meet demand and increase profitability by increasing line speeds on production equipment. For extruded components such as optical fiber buffer tubes, filler rods, cores, or jackets, higher line speeds may result in greater shear rates and higher orientation and residual stress in the finished product especially if an optimal material is not used.

Polycarbonates, fluoropolymer, polybutylene terephthalate, Nylon-12, polypropylene-polyethylene copolymer, polyester elastomer, acetal resins and the like have been used as buffer tube materials. However, these materials have material, product, performance, and economic drawbacks.

For example, polybutylene terephthalate (PBT) is the most commonly used polymeric material for making loose tube fiber optic buffer tubes. However, it has some inherent disadvantages, one of which is that PBT is susceptible to hydrolysis which leads to a loss in strength. Additionally, PBT is a stiff material (flexural modulus of at least 330,000 psi) and any attempt to improve its flexibility (make, it less stiff) results in a more expensive product.

Polyamides are reputed for their outstanding mechanical properties and chemical resistance. However, their resistance to hydrolysis is limited. Further, polyamides are hygroscopic and tend to absorb water which in turn affects their mechanical and electrical properties as well as their dimensional stability.

The copolymer polypropylene-polyethylene (PP) has been used as a buffer tube material as a substitute for PBT. This polymer has a flexural modulus of about 200,000 psi and therefore is more flexible than PBT. However, there are other undesired properties associated with the resin. PP copolymer shrinks during and after processing, which consequently has a heavy bearing on excess fiber length, an important parameter that influences the attenuation of optical fibers. In addition, PP has a lower tensile, flexural and compression strength than PBT. Also the thermal resistance is inferior to an engineering thermoplastic. All of these properties are required for some of the more demanding applications of fiber optic cables.

Polyethylene (PE) though it is flexible, has poor thermal and mechanical properties. It exhibits very high dimensional shrinkage resulting in higher "excess fiber length" numbers. Nylon-6 is hygroscopic and thus, tends to absorb moisture in a humid environment. Further, the processing of nylon needs special screw/barrel design, which is less shear sensitive. It also exhibits shrinkage both during and after extrusion that in turn affects the fiber-to-tube ratio and causes excess fiber length. These are some of the reasons why neither Nylon-6 nor PE has ever been established as an "industry-standard" buffer tube material in the fiber optic industry.

Accordingly, there is a need in the industry for a buffer tube material that has the advantages of thermo-mechanical performance of PBT, chemical resistance of nylon and flexibility and attractive pricing of a polyolefin.

SUMMARY OF THE INVENTION

The present invention provides a fiber optic buffer tube made of a polyamide/polyolefin blend, where the polyamide/polyolefin blend comprises a blend of Nylon-6 and polyethylene. The Nylon-6 and polyethylene blend is about 50–90% Nylon-6 and about 10–50% polyethylene. Alternatively, the Nylon-6 and polyethylene blend is about 60–80% Nylon-6 and about 20–40% polyethylene. The polyamide/polyolefin blend is made of a recyclable material and is heat resistant, kink-resistant, and score-snappable.

The present invention can also be viewed as a fiber optic cable. The fiber optic cable is constructed of at least one buffer tube and at least one transmission medium positioned within the buffer tube. The buffer tube is made of a polyamide/polyolefin blend, as described hereinabove, wherein the polyamide/polyolefin blend comprises a blend of a Nylon-6 and polyethylene. The Nylon-6 and polyethylene blend is about 50–90% Nylon-6 and about 10–50% polyethylene. Alternatively, the Nylon-6 and polyethylene blend is about 60–80% Nylon-6 and about 20–40% polyethylene. The polyamide/polyolefin blend is made of a recyclable material and is heat resistant, kink-resistant, and score-snappable.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

The drawings, not drawn to scale, include.

DETAILED DESCRIPTION OF THE INVENTION

Figure 1:
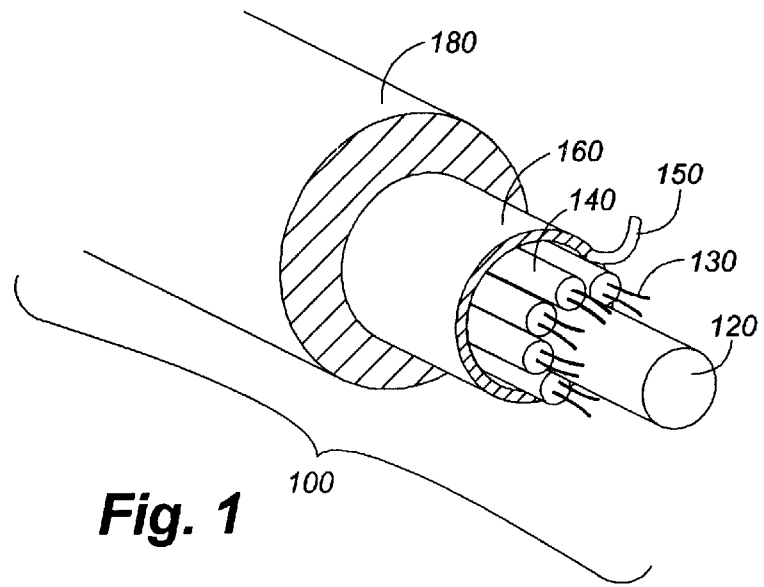
FIG. 1 is a cutaway section of a loose tube fiber optic cable.

FIG. 1 is an illustration of a loose tube fiber optic cable 100, which incorporates the present invention. Typically, this structure incorporates a central strength member 120. A plurality of buffer tubes 140 is stranded around the central strength member 120.

Optical fibers 130 are contained within the buffer tubes 140. Generally, in addition to the optical fibers 130, the buffer tubes 140 are filled with a gel. Radial strength yarns 160 are wrapped around the central strength member 120 and the buffer tubes 140. A ripcord 150 is placed in a position such that the radial strength yarns 160 and outer layers can be at least partially removed to access the inner layers-in the field. Additionally, armor such as a metallic shield (not shown) can be placed around the central strength member 120, buffer tubes 140, and the yarns 160 to further protect the cable. Lastly, an outer jacket 180 is placed around the internal components of the cable.

Figure 2:
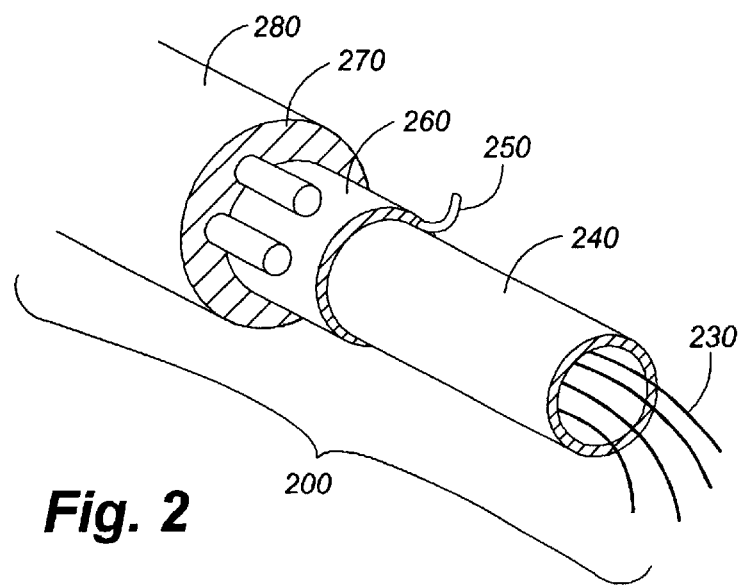
FIG. 2 is a cutaway section of a monotube fiber optic cable.

FIG. 2 is an illustration of a monotube fiber optic cable 200, which incorporates the present invention. The central core tube 240 contains optical fibers 230. Additionally, the tube may contain a gel. Radial strength yarns 260 are wrapped around the central core tube 240. A ripcord 250 is placed in a position such that the radial strength yarns 260 and the outer layers can be at least partially removed to access the inner layers. Strength members 270 are placed around the yarns 260 and central core tube 240. However, the strength members 270 may be placed into different positions within the cable structure. Additionally, armor (not shown) can be placed around the central core tube 240 and the yarn 260 to further protect the cable. Lastly, an outer jacket 280 is placed around the internal components of the cable.

Figure 3:
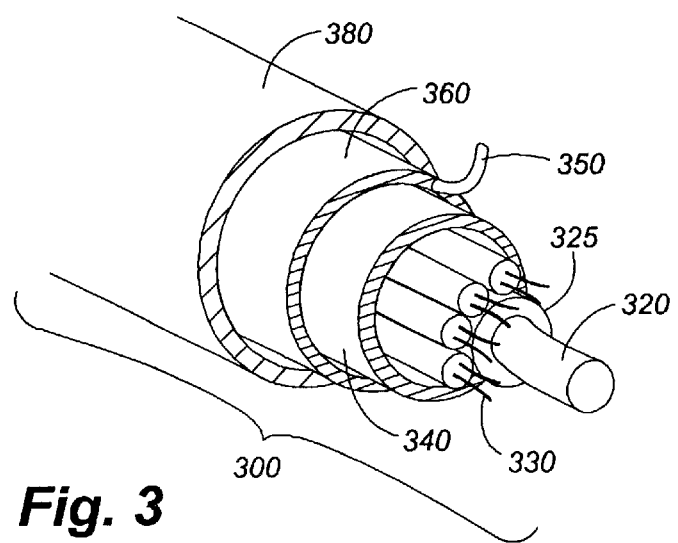
FIG. 3 is a cutaway section of a slotted core fiber optic cable.

FIG. 3 is an illustration of a slotted tube optical fiber cable 300, which incorporates the present invention. A slotted core 325 surrounds a central strength member 320. The slotted core 325 contains within it optical fibers 330. The slotted core 325 is within a buffer tube 340. The buffer tube 340 contains within it the slotted core 325 and also may contain a gel. A radial strength yarn 360 is wrapped around the buffer tube 340, slotted core 325, and the central strength member 320. A ripcord 350 is placed in a position such that the radial strength yarns 360 and other outer layers can be at least partially removed to access the inner portion of the cable. Additionally, armor (not shown) can be placed around the central strength member 320, buffer tube 340, and the yarn 360. to further protect the cable. Lastly, an outer jacket 380 is placed around the internal components of the cable.

One skilled in the art would notice that the fiber optic cables described in FIGS. 1–3 are simplistic diagrams. Thus, it would be clear to one skilled in the art that additions or deletions from these cable designs can be easily accomplished, while not significantly affecting the present invention.

The present invention relates to the buffer tube and core tube materials. Suitably selecting and designing the morphological structure of the two polymers in this compatibilized composition results in a synergistic combination of physical properties. Nylon-6 and polyethylene (PE) are used to make a Nylon-6/PE blend buffer tube material. This buffer tube material eliminates many of the drawbacks (from the standpoint of material/product/cable performance and economics) found in previously used polymers like polycarbonate, fluoropolymer, PBT, Nylon-12, polypropylene-polyethylene copolymer, polyester elastomer, acetal resins, etc. The Nylon-6/PE composition combines the advantages of Nylon-6 and PE without many of their individual weaknesses.

The Nylon-6/PE composition offers such key properties as low sensitivity to moisture, good dimensional stability, good processability, good chemical-resistance, low-density, and recyclability. The buffer tube's surface appears very smooth and is outstandingly stable upon extrusion, which is relevant because this directly influences the tube's dimensions. The fiber-to-tube ratio was found to be within a range of 1–6 mm of excess fiber length measured over a 6 meter long buffer tube. The extruded buffer tubes were very kink-resistant (a key parameter expected of cable in splice enclosures) and can be "score-snapped," for mid-span access. Ability to score-snap easily increases with the stiffness of the material and therefore, it is surprising that even though Nylon-6/PE material is highly flexible, it also score-snaps well. Additionally, the Nylon-6/PE composition is a high temperature heat-resistant polymer that can be used as a universal buffer tube material without significant concern about the buffer tube sticking to the jacket material, which may be caused by high-temperatures encountered during the fiber optic cable jacketing process.

An additional advantage of using the Nylon-6/PE composition is that the buffer tube can be made completely from recycled materials, partially from recycled materials, or from virgin materials. The ability to recycle and use recycled material is of great environmental and economic significance. There exist abundant sources of these recycled thermoplastic resins. Further, the cost savings using recycled materials significantly decreases the cost of producing buffer tubes and concomitantly, decreases the cost of optical fiber cables in general.

Furthermore, the density of the Nylon-6/PE composition is less than PBT, therefore further cost savings relative to PBT are realized. However, if PBT were given the enhanced characteristics that this composition exhibits, it would likely be a cost-prohibitive relative to the Nylon-6/HDPE composition. The pedestal environment with its limited space often requires tight bending radii for fiber optic buffer tubes. Stiff tubes, when subjected to small bending radii, are prone to kinking which often results in increased fiber attenuation or breakage. The kink resistance of a 3.0 mm diameter Nylon-6/polyethylene buffer tube was measured and compared to a standard 3.0 mm PBT tube. Samples, 500 mm in length, were cut for testing. A loop with a diameter of 100 mm was formed and one end of the tube was pulled while holding the other end stationary, decreasing the diameter of the loop until kinking occurred. Kinking was determined by visual observation. The results indicate that a 3.0 mm PBT tube will kink as it reaches a loop diameter of about 35 mm whereas, Nylon-6/PE 3.0 mm buffer tube can be subjected to a bend diameter of 18 mm before kinking occurs. Additional testing of buffer tube shrinkage, cold bend and color permanence was performed per RUS PE-90 protocol and the results were found to be in compliance with the specification.

The Nylon-6/PE composition blend is generally composed of about 50–90% Nylon-6 and about 10–50% PE. A preferred embodiment of the Nylon-6/PE composition blend is composed of about 60–80% Nylon-6 and about 20–40% PE. The major proportion of nylon in the blend results in a morphological structure wherein Nylon-6 forms the matrix and the polyethylene component is regularly dispersed as spherical domains.

Below are the typical processing parameters employed for the present invention to manufacture buffer tube made of Nylon-6/PE resin. It was found that under the following set of processing conditions the extruder output was very stable, as were the tube dimensions. The Nylon-6/PE resin was extruded in a 30 mm Maileffer barrier-mixing type screw extruder with a ratio of length to diameter (L/D) of 24:1 and compression ratio of 2.5:1 and with Nokia-Maileffer model 4/6 crosshead using a screen pack of 40/120/40 mesh.

TABLE 1

Temperature Profile for Extruder Zones (° F.)

| Extruder Zones | ° F. |
| --- | --- |
| Z1 | 450 |
| Z2 | 455 |
| Z3 | 465 |
| Z4 | 480 |
| Collar | 480 |
| Head | 490 |
| Die | 480 |
| Melt Temp. | 473 |

TABLE 2

Other Relevant Experimental Parameters

| | |
| --- | --- |
| Line Speed | 50 meters/minute |
| Pressure | 1460–1560 psi |
| Extruder Screw | RPM 108 |
| Motor Load | 10.8 Amps |
| Jelly (filling compound) | RPM 20.7 |
| Jelly Temperature | 100° C. |
| $1^{st}$ Water Trough Temperature | 40° C. |
| $2^{nd}$ Water Trough Temperature | 20° C. |
| Tube OD | 3.0 mm |
| Tube ID | 2.0 mm |

Under the aforesaid conditions the excess fiber length (EFL) measured over a six-meter long buffer tube was found to be about 3 or 4 mm, which is well within the accepted range. Unlike pure polyethylene that has a great tendency to continue to shrink even after the processing, the Nylon-6/PE tube did not exhibit any post-extrusion shrinkage that affects the EFL measurements.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

I claim the following:

1. A fiber optic buffer tube composed of a polyamide/polyolefin blend, wherein the polyamide comprises approximately 50–90% of the blend and the polyolefin comprises approximately 10–50% of the blend, and wherein the polyamide/polyolefin is a blend of nylon-6 and polyethylene.

2. The buffer tube of claim 1, wherein the polyamide/polyolefin blend is comprised of a recycled material.

3. The buffer tube of claim 1, wherein the polyamide/polyolefin blend is a heat-resistant copolymer.

4. The buffer tube of claim 1, wherein the polyamide/polyolefin blend is kink-resistant.

5. The buffer tube of claim 1, wherein the polyamide/polyolefin blend is score-snappable.

6. A fiber optic buffer tube comprising a blend of nylon-6 and polyethylene, wherein the nylon-6 and polyethylene blend is about 60–80% nylon-6 and about 20–40% polyethylene.

7. A fiber optic cable comprising:
   at least one buffer tube comprised of a polyamide/polyolefin blend, wherein the polyamide/polyolefin blend comprises a blend of nylon-6 and polyethylene, wherein the nylon-6 and polyethylene blend is about 50–90% nylon-6 and about 10–50% polyethylene; and
   at least one transmission medium positioned within the buffer tube.

8. The cable of claim 7, wherein the polyamide/polyolefin blend is comprised of a recycled material.

9. The cable of claim 7, wherein the polyamide/polyolefin blend is a heat-resistant copolymer.

10. The cable of claim 7, wherein the polyamide/polyolefin blend is kink-resistant.

11. The cable of claim 7, wherein the polyamide/polyolefin blend is score-snappable.

12. A fiber optic cable comprising:
   at least one buffer tube comprised of a blend of nylon-6 and polyethylene, wherein the nylon-6 and polyethylene blend is about 60–80% nylon-6 and about 20–40% polyethylene.

* * * * *